J. M. BLASHFIELD.
LOCOMOTIVE SAFETY HAND AND FOOT RAIL.
APPLICATION FILED SEPT. 22, 1916.

1,220,720.

Patented Mar. 27, 1917.
2 SHEETS—SHEET 1.

Inventor
J. M. Blashfield.

By
Attorneys

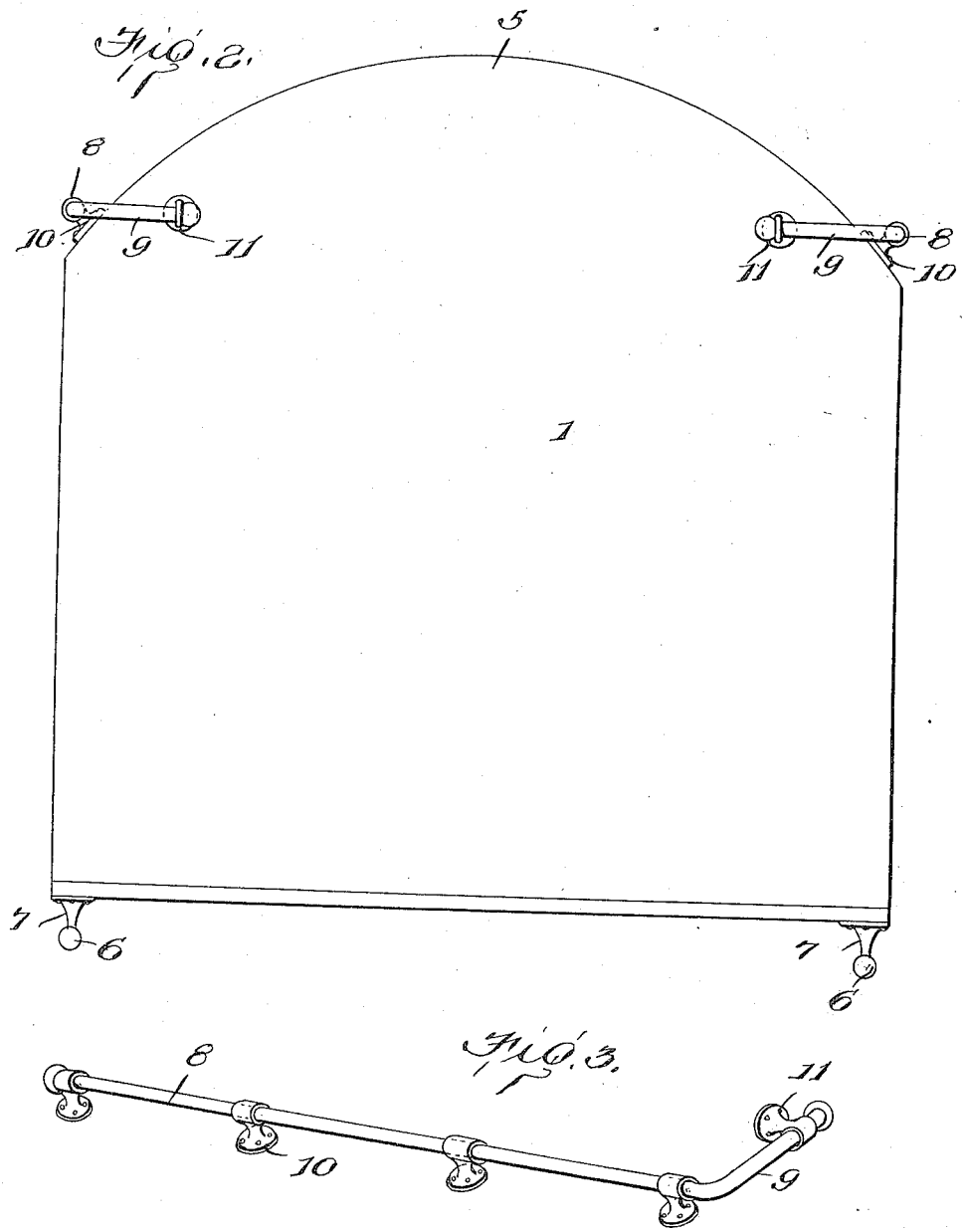

UNITED STATES PATENT OFFICE.

JAMES M. BLASHFIELD, OF JACKSON, MICHIGAN, ASSIGNOR OF ONE-HALF TO CHARLES L. HAYES, OF JACKSON, MICHIGAN.

LOCOMOTIVE SAFETY HAND AND FOOT RAIL.

1,220,720.  Specification of Letters Patent.  Patented Mar. 27, 1917.

Application filed September 22, 1916. Serial No. 121,630.

*To all whom it may concern:*

Be it known that I, JAMES M. BLASHFIELD, a citizen of the United States, residing at Jackson, in the county of Jackson and State of Michigan, have invented certain new and useful Improvements in Locomotive Safety Hand and Foot Rails, of which the following is a specification.

It is a well known fact that the latest types of locomotive boilers are of such size that in the event of broken steam pipes it is practically impossible for the engineer and fireman to escape from the cab. The present invention, therefore, aims to provide means whereby both the engineer and fireman may leave the cab through their respective windows, reach the running boards at the sides of the locomotive boiler and thereby escape from the steam filled cab.

Briefly stated the invention consists in providing upon the cab, foot and hand rails so arranged and extending in such a manner that the locomotive engineer and fireman will be assisted by the hand rail in leaving the cab through their respective windows and then by the use of both the foot and hand rails, reach the running boards at the respective sides of the locomotive boiler.

In the accompanying drawings:—

Fig. 2 is a view looking at the forward ends of the hand and foot rails, the locomotive cab being shown diagrammatically;

Fig. 3 is a perspective view of one of the hand rails.

Figure 1:
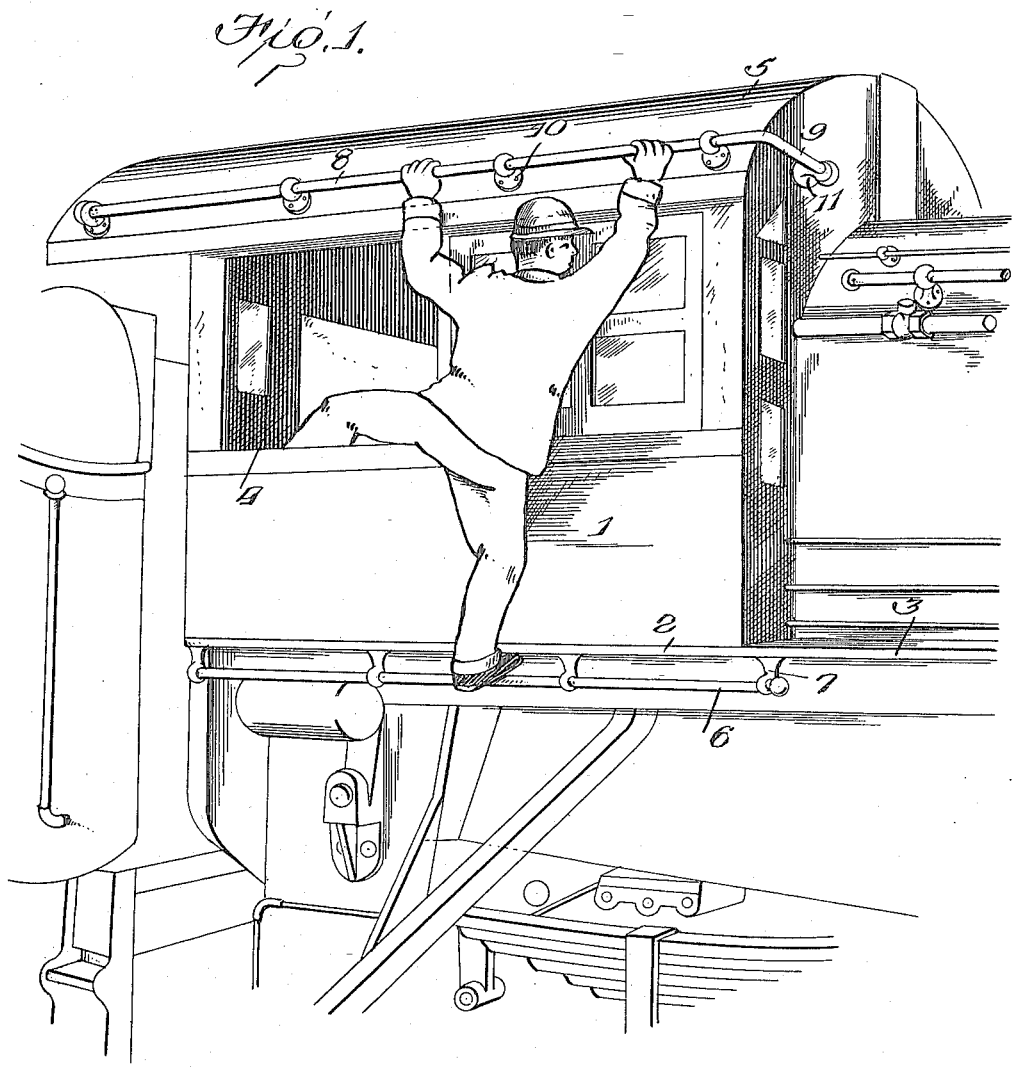
Figure 1 is a perspective view of the rear portion of a locomotive illustrating the application of the invention thereto and the manner in which the hand and foot rails are to be used.

In the drawings the numeral 1 indicates in general the locomotive cab; 2 the floor thereof; 3 the running boards at the sides of the locomotive boiler; 4 the cab windows and 5 the arched roof of the cab.

The foot rail of the present invention is indicated by the numeral 6 and is provided at suitable intervals with attaching brackets which are indicated by the numeral 7. By reference to Fig. 1 of the drawings it will be observed that the brackets 7 are secured to the underside of the floor 2 of the locomotive cab and that the rail supported by the brackets extends from the rear end of the cab forwardly to a point a short distance in advance of the front of the cab, the foremost one of the said brackets being secured to the underside of the running board 3. By reference to Fig. 2 it will be observed that the foot rail is located wholly within the bounds of the sides of the cab and consequently will not interfere with the passage of the locomotive past trains or other objects which ordinarily it is capable of passing. It will be observed, however, by reference to Fig. 1 that the engineer or fireman in escaping from the cab may conveniently reach and make use of the foot rail.

The hand rail is indicated in general by the numeral 8 and is provided with a laterally turned forward end indicated by the numeral 9. At suitable intervals the rail 8 is provided with attaching brackets 10 corresponding to the brackets 7 previously described and the laterally turned end portion 9 of the said rail is provided with an attaching bracket 11. The brackets 10 are secured to the arched roof of the cab at the side thereof and the bracket 11 is secured to the forward wall of the cab as clearly shown in Figs. 1 and 2 of the drawings, the said end portion 9 of each rail extending inwardly in advance of the said forward wall of the cab. It will be observed that as in the case of the foot rail, the hand rail 8 extends the entire length of the cab and above the eaves of the roof. It will also be observed by reference to Fig. 2 of the drawings that the rail 8 is located as in the case of the foot rail, wholly within the bounds of the sides of the cab.

Referring now to Fig. 1 it will be readily understood that inasmuch as a set of the rails is provided at each side of the cab, the engineer and fireman in the event of broken steam pipes may leave the cab through their respective windows by making use of the hand and foot rails and may follow these rails to the running boards 3 at the respective sides of the locomotive boiler at which point they will not be liable to injury from the escaping steam.

Having thus described the invention, what is claimed as new is:

1. The combination with a locomotive, of a foot rail extending beneath the floor of the cab thereof at each side of the cab, and a hand rail extending along each said side of the cab above the eaves of the roof of the cab.

2. The combination with a locomotive, of a foot rail extending beneath the floor of the cab thereof at each side of the cab and from the rear end of the cab to the running board at the respective sides of the locomotive, and a hand rail extending along each said side of the cab above the roof of the cab and from the rear end of the said cab to the forward end thereof.

3. The combination with a locomotive, of a foot rail extending beneath the floor of the cab thereof at each side of the cab, and from the rear end of the cab to the running board at the respective sides of the locomotive, and a hand rail extending along each said side of the cab above the roof of the cab and from the rear end of the said cab to the forward end thereof, the said hand rails being provided with a lateral forward end extending transversely of the front wall of the cab.

4. The combination with a locomotive, of a foot rail extending beneath the floor of the cab thereof at each side of the cab, and a hand rail extending along each said side of the cab above the roof of the cab, the said rails being located wholly within the bounds of the respective sides of the cab.

5. The combination with a locomotive, of a foot rail extending beneath the floor of the cab thereof at one side of the cab, and a hand rail extending along the said side of the cab above the eaves of the roof of the cab.

6. The combination with a locomotive, of a foot rail extending along one side of the cab near the floor thereof, and a hand rail extending along the said side of the cab near the roof thereof.

In testimony whereof I affix my signature.

JAMES M. BLASHFIELD. [L. S.]

Copies of this patent may be obtained for five cents each, by addressing the "Commissioner of Patents, Washington, D. C."